US011153828B2

(12) United States Patent
Yang et al.

(10) Patent No.: US 11,153,828 B2
(45) Date of Patent: Oct. 19, 2021

(54) SPECTRAL EFFICIENCY DETERMINATION FOR POWER CONTROL FOR UPLINK CONTROL INFORMATION TRANSMISSION ON AN UPLINK DATA CHANNEL

(71) Applicant: QUALCOMM Incorporated, San Diego, CA (US)

(72) Inventors: Wei Yang, San Diego, CA (US); Yi Huang, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/544,665

(22) Filed: Aug. 19, 2019

(65) Prior Publication Data

US 2020/0068496 A1 Feb. 27, 2020

Related U.S. Application Data

(60) Provisional application No. 62/721,567, filed on Aug. 22, 2018.

(51) Int. Cl.
*H04W 52/14* (2009.01)
*H04W 72/04* (2009.01)

(52) U.S. Cl.
CPC ....... *H04W 52/146* (2013.01); *H04W 72/042* (2013.01); *H04W 72/0413* (2013.01)

(58) Field of Classification Search
CPC ............. H04W 52/146; H04W 72/042; H04W 72/0413; H04W 52/16; H04W 52/262; H04B 7/0413; H04L 5/0035; H04L 5/0055; H04L 5/001; H04L 5/0051; H04L 5/0091; H04L 5/0053; H04L 5/0057
See application file for complete search history.

(56) References Cited

U.S. PATENT DOCUMENTS

2018/0026769 A1* 1/2018 Lee ................. H04L 5/0053
370/329
2020/0252178 A1* 8/2020 Marinier ............ H04W 72/042

FOREIGN PATENT DOCUMENTS

WO 2014100952 A1 7/2014

OTHER PUBLICATIONS

"3rd Generation Partnership Project; Technical Specification Group Radio Access Network; NR; Physical layer procedures for control (Release 15)", 3GPP Standard, Technical Specification, 3GPP TS 38.213, 3rd Generation Partnership Project (3GPP), Mobile Competence Centre; 650, Route Des Lucioles; F-06921 Sophia-Antipolis Cedex, France, vol. RAN WG1, No. V15.2.0, Jun. 29, 2018 (Jun. 29, 2018), pp. 1-99, XP051474490, [retrieved on Jun. 29, 2018], section 7.1.1, section 8.1, section 9.3, pp. 32-33, table 8.1_1, section 10-10.1; pp. 66-pp. 69; tables 10.1-1.

(Continued)

Primary Examiner — Ankur Jain
(74) Attorney, Agent, or Firm — Patterson & Sheridan, L.L.P

(57) ABSTRACT

Certain aspects of the present disclosure relate to methods and apparatus for determining spectral efficiency for transmitting uplink control information (UCI) on an uplink data channel for use in performing uplink power control.

36 Claims, 6 Drawing Sheets

(56) References Cited

OTHER PUBLICATIONS

CATT: "Remaining Issues of NR Power Control", 3GPP Draft, 3GPP TSG RAN WG1 Meeting #95, R1-1812608 PC, 3rd Generation Partnership Project (3GPP), Mobile Competence Centre, 650, Route Des Lucioles, F-06921 Sophia-Antipolis Cedex, France vol. RAN WG1, No. Spokane, USA, Nov. 12, 2018-Nov. 16, 2018, Nov. 11, 2018 (Nov. 11, 2018), XP051554564, pp. 1-3, Retrieved from the Internet: URL:http://www.3gpp.org/ftp/Meetings%5F3GPP%5FSYNC/RAN1/Docs/R1%2D1812608%2Ezip [retrieved on Nov. 11, 2018] section 1 section 2.
International Search Report and Written Opinion—PCT/US2019/047300—ISA/EPO—dated Nov. 7, 2019.

* cited by examiner

SPECTRAL EFFICIENCY DETERMINATION FOR POWER CONTROL FOR UPLINK CONTROL INFORMATION TRANSMISSION ON AN UPLINK DATA CHANNEL

CROSS-REFERENCE TO RELATED APPLICATION(S)

This application claims benefit of and priority to U.S. Provisional Patent Application Ser. No. 62/721,567, filed Aug. 22, 2018, herein incorporated by reference in its entirety as if fully set forth below and for all applicable purposes.

BACKGROUND

Field of the Disclosure

The present disclosure relates generally to wireless communication systems and determining spectral efficiency for transmitting uplink control information (UCI) on an uplink data channel for use in performing uplink power control.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations (BSs) may define an eNodeB (eNB). In other examples (e.g., in a next generation or 5th generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide method for wireless communications by a user equipment (UE). The method generally includes receiving information indicative of a modulation coding scheme (MCS) for use by the UE to transmit uplink control information (UCI) on an uplink data channel. The method further includes determining a spectral efficiency for transmitting the UCI based at least in part on the MCS. The method further performing uplink power control based at least in part on the determined spectral efficiency. The method further includes transmitting the UCI without uplink data on the uplink data channel using an uplink power based at least in part on the performed uplink power control.

Certain aspects provide a UE configured for wireless communication. The UE includes a memory and a processor communicatively coupled to the memory, wherein the processor is configured to receive information indicative of a modulation coding scheme (MCS) for use by the UE to transmit uplink control information (UCI) on an uplink data channel. The processor is also configured to determine a spectral efficiency for transmitting the UCI based at least in part on the MCS. The processor is also configured to perform uplink power control based at least in part on the determined spectral efficiency. The processor is also configured to transmit the UCI without uplink data on the uplink data channel using an uplink power based at least in part on the performed uplink power control.

Certain aspects provide an apparatus for wireless communication. The apparatus includes means for receiving information indicative of a modulation coding scheme (MCS) for use by the apparatus to transmit uplink control information (UCI) on an uplink data channel. The apparatus also includes means for determining a spectral efficiency for transmitting the UCI based at least in part on the MCS. The apparatus also includes means for performing uplink power control based at least in part on the determined spectral efficiency. The apparatus also includes means for transmitting the UCI without uplink data on the uplink data channel using an uplink power based at least in part on the performed uplink power control.

Certain aspects provide a non-transitory computer-readable storage medium that stores instructions that when executed by a processor of a UE, cause the UE to perform a method of wireless communication, including receiving information indicative of a modulation coding scheme (MCS) for use by the UE to transmit uplink control information (UCI) on an uplink data channel. The method also includes determining a spectral efficiency for transmitting the UCI based at least in part on the MCS. The method also includes performing uplink power control based at least in part on the determined spectral efficiency. The method also includes transmitting the UCI without uplink data on the uplink data channel using an uplink power based at least in part on the performed uplink power control.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
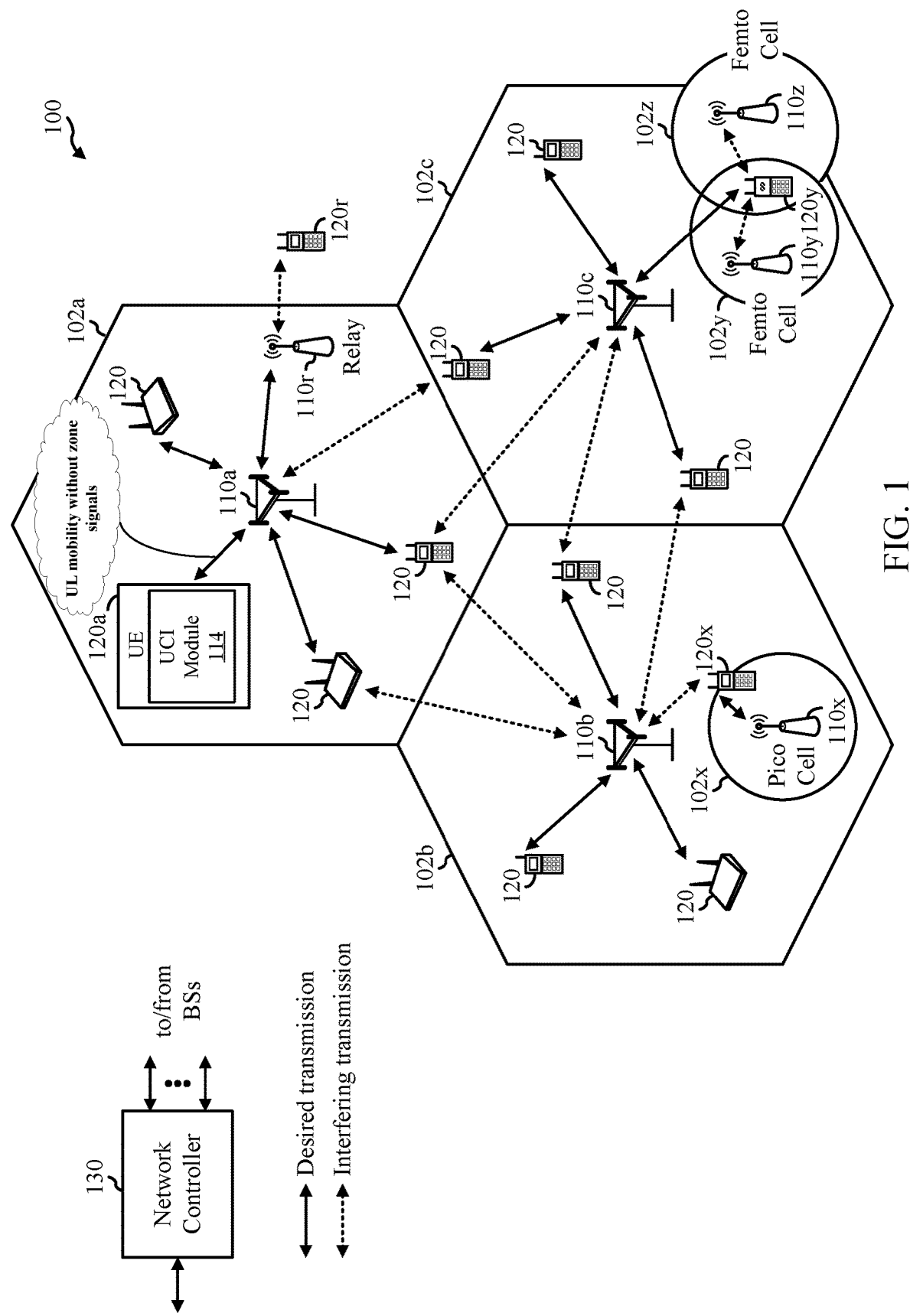
FIG. 1 is a block diagram conceptually illustrating an example telecommunications system, in accordance with certain aspects of the present disclosure.

3GPP wireless communication standards (e.g., NR Rel-15) have proposed UEs perform uplink power control for a physical uplink shared channel (PUSCH) based on bit per resource element (BPRE) calculations. BPRE may be an indicator of spectral efficiency on the PUSCH. In particular, a UE performs uplink power control to determine an uplink power (e.g., uplink power level) to use to transmit signals (e.g., transmissions) on the PUSCH.

A UE can transmit different types of transmissions on the PUSCH including 1) PUSCH transmissions with uplink shared channel (UL-SCH) data, and 2) UCI transmission via the PUSCH without UL-SCH data. Accordingly, in certain aspects, the UE can transmit uplink data, and more particularly UL-SCH data, on the PUSCH, or the UE can transmit control information, and more particularly UCI, without uplink data on the PUSCH. Uplink data may refer to the actual payload data for transmission by the UE, such as to a BS, while UCI refers to uplink control information used for controlling transmissions on the uplink or the downlink.

UCI can include one or more of channel state information (CSI) report and hybrid automatic repeat request acknowledgement (HARQ-ACK), such as defined in 3GPP standards (e.g., NR Rel-15). When referring to CSI, UCI can more particularly include one or more of CSI-part 1 and CSI-part 2, such as defined in 3GPP standards (e.g., NR Rel-15). For example, UCI can include a Type I CSI report including CSI-part 1 and CSI-part 2. In such a Type I CSI report, CSI-part 1 includes a rank indicator (RI)/channel rank indicator (CRI) and a channel quality indicator (CQI) for the first codeword used. Further, in such a Type I CSI report, CSI-part 2 includes a precoding matrix index (PMI) and a CQI for the second codeword used (e.g., when RI indicates a communication rank greater than 4). In another example, UCI can include a Type II CSI report including CSI-part 1 and CSI-part 2. In such a Type II CSI report, CSI-part 1 includes a RI, CQI, and an indication of the number of non-zero wideband amplitude coefficients per layer (e.g., spatial layer). Further, in such a Type II CSI report, CSI-part 2 includes a PMI corresponding to the indicated non-zero wideband amplitude coefficients in CSI-part 1.

For a receiver (e.g., BS) of the UCI on the uplink, the BS does not a priori know whether a CSI-part 2 is to be included or not in the UCI, and further does not know the payload size of CSI-part 2. Accordingly, when the BS determines the MCS and number of resource elements (REs) (e.g., resources in time and frequency used for communication) that the UE should use for transmitting the UCI on the uplink, the BS does not accurately know the payload size for CSI-part 2. Accordingly, the BS may need to first decode CSI-part 1, then based on CSI-part 1, decode the information in CSI-part 2. A UE may also only send CSI-part 2 to the BS when there are sufficient resources (e.g., REs) allocated to the UE on the PUSCH for transmitting UCI including CSI-part 2.

As discussed, a UE can perform UCI transmission via the PUSCH without UL-SCH data. In such cases, 3GPP wireless communication standards (e.g., NR Rel-15, 3GPP TS 38.213 Rel 15) have proposed UEs perform uplink power control and calculate uplink power Δ according to the following equation:

$$\Delta_{TF,b,f,c}(i)=10\log_{10}((2^{BPRE \cdot K_s}-1) \cdot \beta_{offset}^{PUSCH} \text{ for } K_S=1.25; \text{ and } \Delta_{TF,b,f,c}(i)=0 \text{ for } K_S=0,$$

where $K_S$ is provided by higher layer parameter deltaMCS provided for each UL bandwidth part (BWP) b of each carrier f and serving cell c, where $\beta_{offset}^{PUSCH}$ is a rate offset between a rate for transmitting UCI and a rate for transmitting UL-SCH data on the PUSCH.

In certain cases, the BPRE is calculated according to the following equation for UCI transmission via the PUSCH without UL-SCH data:

$BPRE = O_{CSI}/N_{RE}$;

where $O_{CSI}$ is the number of bits used for CSI-part 1 including cyclic redundancy (CRC) bits associated with CSI-part 1, and $N_{RE}$ is the number of resource elements allocated for the transmission of UCI via the PUSCH without UL-SCH data determined as $$N_{RE} = M_{RB,b,f,c}^{PUSCH}(i) \cdot \sum_{j=0}^{N_{symb,b,f,c}^{PUSCH}(i)-1} N_{sc,data}^{RB}(i,j),$$

where $N_{symb,b,f,c}^{PUSCH}(i)$ is the number of symbols for PUSCH transmission occasion i on UL BWP b of carrier f of serving cell c, $N_{sc,data}^{RB}(i)$ is a number of subcarriers excluding DM-RS subcarriers in PUSCH symbol j, $0 \leq j < N_{symb,b,f,c}^{PUSCH}(i)$ and C, $K_r$ are defined.

Accordingly, in certain cases, the BPRE is calculated based on the number of bits used for CSI-part 1 including CRC bits and the total number of resource elements allocated for the transmission of UCI via the PUSCH without UL-SCH. The UE may determine the total number of resource elements based on information indicative of time resources and frequency resources allocated to the UE on the PUSCH received from the BS. The total number of resource elements allocated for the transmission of UCI includes resource elements for transmitting each of CSI-part 1, CSI-part 2, and HARQ-ACK. However, as indicated, the BPRE calculation is based on the number of bits used for CSI-part 1, but also the number of resource elements used for all UCI including CSI-part 1, CSI-part 2, and HARQ-ACK. Accordingly, the calculated BPRE may be different than the actual spectral efficiency of the CSI-part 1 (e.g., when there are other types of UCI such as CSI-part 2 and HARQ-ACK on the PUSCH).

Accordingly, certain aspects herein relate to determining a spectral efficiency (e.g., BPRE) for transmitting UCI without uplink data (e.g., UL-SCH data) on an uplink data channel (e.g., PUSCH) based at least in part on a modulation coding scheme (MCS) for use by the UE to transmit uplink data on the uplink data channel. Further, aspects relate to performing uplink power control based on the determined spectral efficiency and transmitting the UCI without uplink data on the uplink data channel using an uplink power based at least in part on the performed uplink power control.

In certain aspects, the determined spectral efficiency according to aspects herein is a more accurate calculation, and therefore, when used as part of uplink power control, can lead to a more accurate transmit power for transmitting the UCI on the uplink data channel. For example, the previous BPRE calculation based on the number of bits used for CSI-part 1 including CRC bits and the total number of resource elements allocated for the transmission of UCI via the PUSCH without UL-SCH can lead to a lower calculated BPRE than the actual BPRE. Accordingly, the transmit uplink power determined by the UE for transmitting the UCI via the PUSCH without UL-SCH may be smaller, and reception of the UCI at the BS may not be reliable due to the smaller power. Accordingly, the BS may not be able to decode the UCI successfully.

Aspects herein provide more accurate spectral efficiency calculations, which can lead to more accurate transmit power calculations for transmitting the UCI on the uplink data channel. The transmit power is not calculated as too high, thereby avoiding excess battery consumption at the UE and providing power savings. Further, the transmit power may not be calculated too low, thereby yielding better reliability in transmission of the UCI to the BS, reducing the need for additional transmissions, thereby improving bandwidth usage and reliability of the wireless network.

It should be noted that though certain aspects are described with respect to uplink power control on an uplink data channel, and in particular a PUSCH, such aspects may similarly be used for uplink power control on other appropriate uplink channels.

Further, though certain aspects are described with respect to calculating a BPRE, such aspects may similarly be used for calculating other appropriate spectral efficiencies.

In addition, though certain aspects are described with respect to calculating spectral efficiency based on parameters associated with CSI-part 1, such aspects may similarly be used for calculating spectral efficiency based on parameters associated with other suitable UCI. However, utilizing CSI-part 1 specifically may provide further advantages over other suitable UCI in certain cases as further discussed herein.

In addition, though certain aspects are described with respect to transmitting UCI without uplink data, and more specifically without UL-SCH data, on an uplink data channel, such aspects could be used for transmitting UCI on the uplink data channel more generally, or without other uplink data. However, utilizing such aspects for transmitting UCI without uplink data may provide additional benefits. For example, the uplink power control accuracy for transmitting UCI without uplink data may be more inaccurate using previous techniques than the uplink power control accuracy for transmitting UCI with uplink data using previous techniques as the UCI transmission may play a larger role in the uplink power control calculation when transmitting UCI without uplink data. Therefore, using certain aspects herein to increase the accuracy of uplink power control for transmitting UCI without uplink data may provide a larger increase in accuracy than when used to increase the accuracy of uplink power control for transmitting UCI with uplink data.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed. As shown in FIG. 1, a user equipment (UE) 120a includes a UCI module 114 that may be configured for determining a spectral efficiency (e.g., BPRE), performing uplink power control based on the determined spectral efficiency, and transmitting a UCI without uplink data on an uplink data channel using an uplink power based at least in part on the performed uplink power control, according to aspects described herein.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth (e.g., system frequency band) into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent sub-carriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with pre-coding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
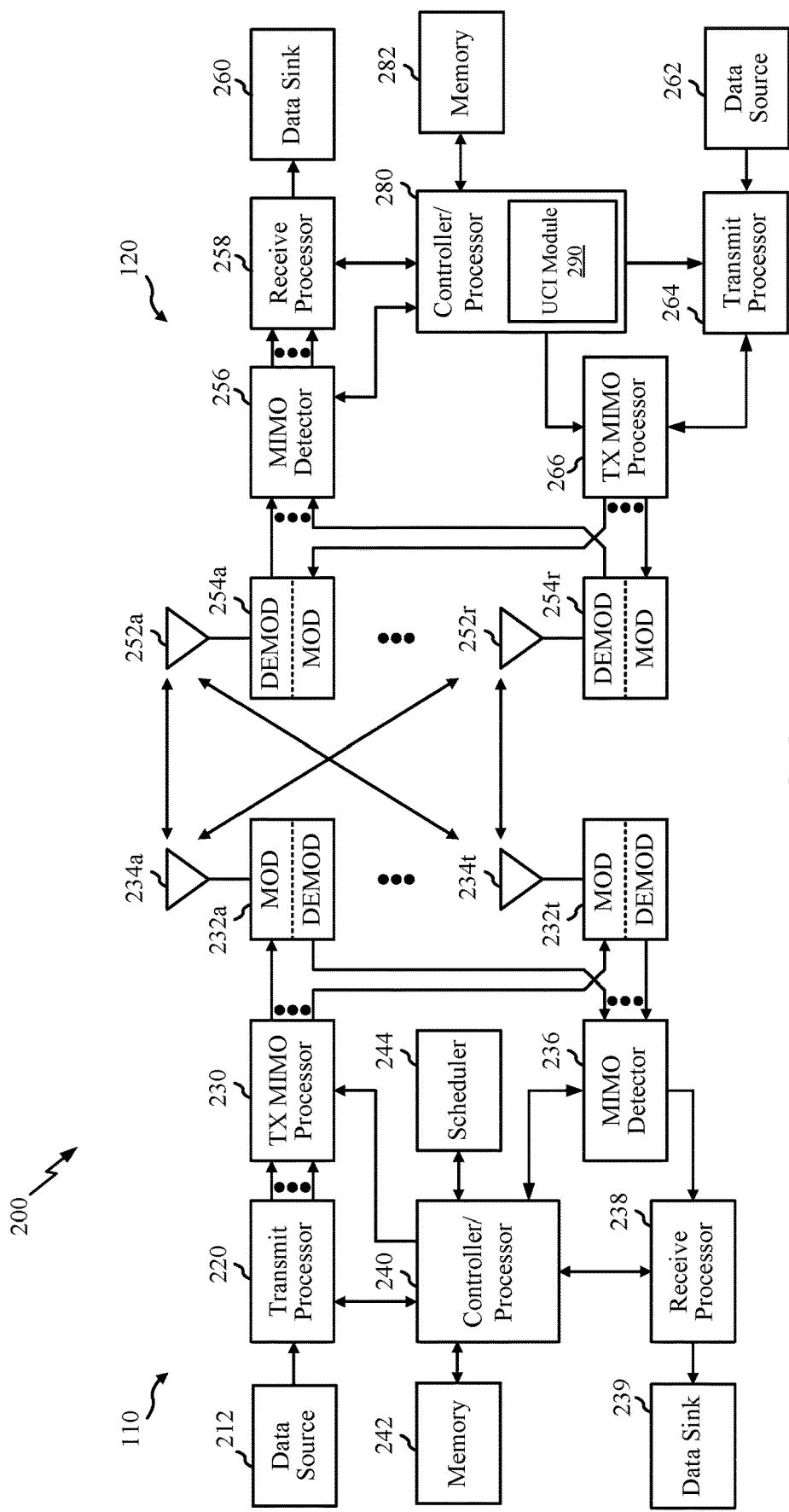
FIG. 2 is a block diagram conceptually illustrating a design of an example base station (BS) and user equipment (UE), in accordance with certain aspects of the present disclosure.

FIG. 2 illustrates example components 200 of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 252, Tx/Rx 222, processors 266, 258, 264, and/or controller/processor 280 of the UE 120 and/or antennas 234, processors 220, 230, 238, and/or controller/processor 240 of the BS 110 may be used to perform the operations described herein and illustrated with reference to FIG. 5. For example, as shown in FIG. 2, a UE 120 includes a UCI module 290 that may be configured for determining a spectral efficiency (e.g., BPRE), performing uplink power control based on the determined spectral efficiency, and transmitting a UCI without uplink data on an uplink data channel using an uplink power based at least in part on the performed uplink power control, according to aspects described herein For a restricted association scenario, the base station 110 may be the macro BS 110c in FIG. 1, and the UE 120 may be the UE 120y. The base station 110 may also be a base station of some other type. The base station 110 may be equipped with antennas 234a through 234t, and the UE 120 may be equipped with antennas 252a through 252r.

At the base station 110, a transmit processor 220 may receive data from a data source 212 and control information from a controller/processor 240. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 220 may process (e.g., encode and symbol map) the data and control information to obtain data symbols and control symbols, respectively. The processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. For example, the TX MIMO processor 230 may perform certain aspects described herein for RS multiplexing. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. For example, MIMO detector 256 may provide detected RS transmitted using techniques described herein. A receive processor 258 may process (e.g., demodulate, deinterleave, and decode) the detected symbols, provide decoded data for the UE 120 to a data sink 260, and provide decoded control information to a controller/processor 280. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 232 may be in the distributed units.

On the uplink, at the UE 120, a transmit processor 264 may receive and process data (e.g., for the Physical Uplink Shared Channel (PUSCH)) from a data source 262 and control information (e.g., for the Physical Uplink Control Channel (PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the base station 110 may perform or direct processes for the techniques described herein. The processor 280 and/or other processors and modules at the UE 120 may perform or direct, e.g., the execution of the functional blocks illustrated in FIG. 5, and/or other processes for the techniques described herein. The memories 242 and 282 may store data and program codes for the BS 110 and the UE 120, respectively. A scheduler 244 may schedule UEs for data transmission on the downlink and/or uplink.

Figure 3:
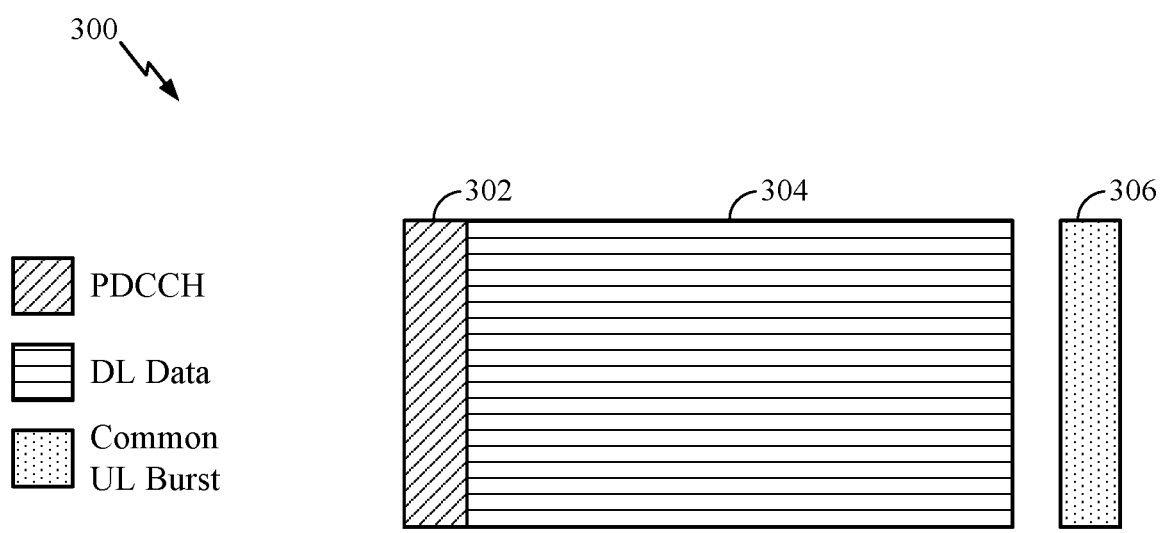
FIG. 3 is a block diagram illustrating an example of a downlink-centric (DL-centric) subframe, in accordance with certain aspects of the present disclosure.

FIG. 3 is a diagram 300 showing an example of a DL-centric subframe. The DL-centric subframe may include a control portion 302. The control portion 302 may exist in the initial or beginning portion of the DL-centric subframe. The control portion 302 may include various scheduling information and/or control information corresponding to various portions of the DL-centric subframe. In some configurations, the control portion 302 may be a physical DL control channel (PDCCH), as indicated in FIG. 3. The DL-centric subframe may also include a DL data portion 304. The DL data portion 304 may sometimes be referred to as the payload of the DL-centric subframe. The DL data portion 304 may include the communication resources utilized to communicate DL data from the scheduling entity (e.g., UE or BS) to the subordinate entity (e.g., UE). In some configurations, the DL data portion 304 may be a physical DL shared channel (PDSCH).

The DL-centric subframe may also include a common UL portion 306. The common UL portion 306 may sometimes be referred to as an UL burst, a common UL burst, and/or various other suitable terms. The common UL portion 306 may include feedback information corresponding to various other portions of the DL-centric subframe. For example, the common UL portion 306 may include feedback information corresponding to the control portion 302. Non-limiting examples of feedback information may include an ACK signal, a NACK signal, a HARQ indicator, and/or various other suitable types of information. The common UL portion 306 may include additional or alternative information, such as information pertaining to random access channel (RACH) procedures, scheduling requests (SRs), and various other suitable types of information. As illustrated in FIG. 3, the end of the DL data portion 304 may be separated in time from the beginning of the common UL portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 4:
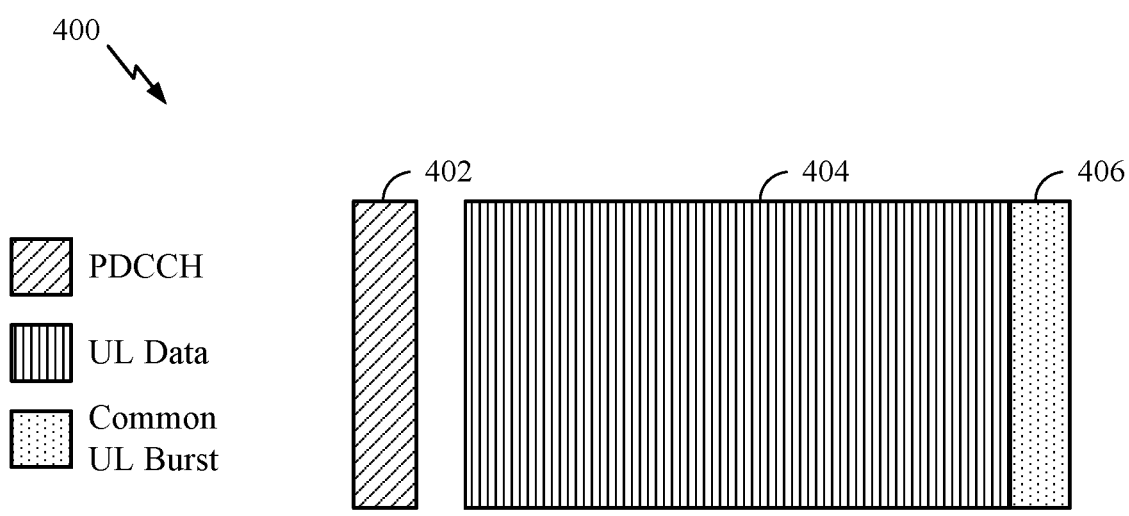
FIG. 4 is a block diagram illustrating an example of an uplink-centric (UL-centric) subframe, in accordance with certain aspects of the present disclosure.

FIG. 4 is a diagram 400 showing an example of an UL-centric subframe. The UL-centric subframe may include a control portion 402. The control portion 402 may exist in the initial or beginning portion of the UL-centric subframe. The control portion 402 in FIG. 4 may be similar to the control portion described above with reference to FIG. 3. The UL-centric subframe may also include an UL data portion 404. The UL data portion 404 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 402 may be a physical DL control channel (PDCCH).

As illustrated in FIG. 4, the end of the control portion 402 may be separated in time from the beginning of the UL data portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 406. The common UL portion 406 in FIG. 4 may be similar to the common UL portion 406 described above with reference to FIG. 4. The common UL portion 406 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Spectral Efficiency Determination for
Power Control for Uplink Control Information
Transmission on an Uplink Data Channel As discussed, certain aspects herein relate to determining a spectral efficiency (e.g., BPRE) for transmitting UCI without uplink data (e.g., UL-SCH data) on an uplink data channel (e.g., PUSCH) based at least in part on a modulation coding scheme (MCS) for use by the UE (e.g., UE 120) to transmit uplink data on the uplink data channel. Further, aspects relate to performing uplink power control based on the determined spectral efficiency and transmitting the UCI without uplink data on the uplink data channel using an uplink power based at least in part on the performed uplink power control.

3GPP wireless communication standards (e.g., NR Rel-15, 3GPP TS 38.212 Rel-15) have been proposed that allow a UE, such as UE 120, to determine a number of coded modulation symbols per layer for different UCI transmissions on the PUSCH without UL-SCH. The number of coded modulation symbols per layer may correspond to or equal a number of resource elements (REs) on a PUSCH to be used by the UE for transmitting a particular UCI on the PUSCH to a receiver (e.g., BS 110) without UL-SCH.

For example, the number of coded modulation symbols per layer for HARQ-ACK transmission on PUSCH without UL-SCH may be denoted as $Q'_{ACK}$ and calculated according to the following equation:

$$Q'_{ACK} = \min\left\{\left\lceil\frac{(O_{ACK} + L_{ACK}) \cdot \beta_{offset}^{PUSCH}}{R \cdot Q_m}\right\rceil, \left\lceil\alpha \cdot \sum_{l=l_0}^{N_{symb,all}^{PUSCH}-1} M_{sc}^{UCI}(l)\right\rceil\right\};$$

where,
$O_{ACK}$ is the number of HARQ-ACK bits;
if $O_{ACK} \geq 360$, $L_{ACK}=11$; otherwise $L_{ACK}$ is the number of CRC bits for HARQ-ACK;
$\beta_{offset}^{PUSCH}=\beta_{offset}^{HARQ-ACK}$ (e.g., the rate offset between a rate for transmitting HARQ-ACK and a rate for transmitting uplink data on the uplink data channel)
$M_{sc}^{PUSCH}$ is the scheduled bandwidth of the PUSCH transmission, expressed as a number of subcarriers;
$M_{sc}^{PT-RS}(l)$ is the number of subcarriers in OFDM symbol l that carries phase-tracking reference signal (PTRS), in the PUSCH transmission;

$M_{sc}^{UCI}(l)$ is the number of resource elements that can be used for transmission of UCI in OFDM symbol l, for $l=0, 1, 2, \ldots, N_{symb,all}^{PUSCH}-1$, in the PUSCH transmission and $N_{symb,all}^{PUSCH}$ is the total number of OFDM symbols of the PUSCH, including all OFDM symbols used for demodulation reference symbol (DMRS);

for any OFDM symbol that carries DMRS of the PUSCH, $M_{sc}^{UCI}(l)=0$;

for any OFDM symbol that does not carry DMRS of the PUSCH, $M_{sc}^{UCI}(l)=M_{sc}^{PUSCH}-M_{sc}^{PT-RS}(l)$;

$l_0$ is the symbol index of the first OFDM symbol that does not carry DMRS of the PUSCH, after the first DMRS symbol(s), in the PUSCH transmission;

R is a target code rate of the PUSCH;

$Q_m$ is the modulation order of the PUSCH;

α is configured by higher layer parameter scaling.

Accordingly, the number of REs for HARQ-ACK transmission on PUSCH without UL-SCH is calculated independent of the number of REs used for CSI-part 1 and CSI-part 2.

For example, the number of coded modulation symbols per layer for CSI-part 1 transmission on PUSCH without UL-SCH may be denoted as $Q'_{CSI\text{-}part1}$ and calculated according to the following equation:

if there is CSI part 2 to be transmitted on the PUSCH, $$Q'_{CSI-1} = \min\left\{\left\lceil \frac{(O_{CSI-1}+L_{CSI-1})\cdot \beta_{offset}^{PUSCH}}{R\cdot Q_m}\right\rceil, \sum_{l=0}^{N_{symb,all}^{PUSCH}-1} M_{sc}^{UCI}(l) - Q'_{ACK}\right\}$$

else $$Q'_{CSI-1} = \sum_{l=0}^{N_{symb,all}^{PUSCH}-1} M_{sc}^{UCI}(l) - Q'_{ACK}$$

end if where, $O_{CSI-1}$ is the number of bits for CSI part 1;

if $O_{CSI-1} \geq 360$, $L_{CSI-1}=11$; otherwise $L_{CSI-1}$ is the number of CRC bits for CSI part 1;

$\beta_{offset}^{PUSCH} = \beta_{offset}^{CSI\text{-}part1}$ (e.g., the rate offset between a rate for transmitting CSI part 1 and a rate for transmitting uplink data on the uplink data channel);

$M_{sc}^{PUSCH}$ is the scheduled bandwidth of the PUSCH transmission, expressed as a number of subcarriers;

$M_{sc}^{PT-RS}(l)$ is the number of subcarriers in OFDM symbol l that carries PTRS, in the PUSCH transmission;

$Q'_{ACK}$ is the number of coded modulation symbols per layer for HARQ-ACK transmitted on the PUSCH if number of HARQ-ACK information bits is more than 2, and $$Q'_{ACK} = \sum_{l=0}^{N_{symb,all}^{PUSCH}-1} \overline{M}_{sc,rvd}^{ACK}(l)$$

if the number of HARQ-ACK information bits is no more than 2 bits, where $\overline{M}_{sc,nd}^{ACK}(l)$ is the number of reserved resource elements for potential HARQ-ACK transmission in OFDM symbol l, for $l=0, 1, 2, \ldots, N_{symb,all}-1$, in the PUSCH transmission;

$M_{sc}^{PUSCH}(l)$ is the number of resource elements that can be used for transmission of UCI in OFDM symbol l, for $i=0, 1, 2, \ldots, N_{symb,all}^{PUSCH}-1$, in the PUSCH transmission and $N_{symb,all}^{PUSCH}$ is the total number of OFDM symbols of the PUSCH, including all OFDM symbols used for DMRS;

for any OFDM symbol that carries DMRS of the PUSCH, $M_{sc}^{UCI}(l)=0$;

for any OFDM symbol that does not carry DMRS of the PUSCH, $M_{sc}^{UCI}(l)=M_{sc}^{PUSCH}-M_{sc}^{PT-RS}(l)$ R is the target code rate of the PUSCH;

$Q_m$ is the modulation order of the PUSCH.

Accordingly, the number of REs for CSI-part 1 transmission on PUSCH without UL-SCH is calculated dependent on the number of REs used for HARQ-ACK and independent of the number of REs used for CSI-part 2.

For example, the number of coded modulation symbols per layer for CSI-part 2 transmission on PUSCH without UL-SCH may be denoted as $Q'_{CSI\text{-}part2}$ and calculated according to the following equation:

$$Q'_{CSI-2} = \sum_{l=0}^{N_{symb,all}^{PUSCH}-1} M_{sc}^{UCI}(l) - Q'_{ACK} - Q'_{CSI-1}$$

where $M_{sc}^{PUSCH}$ is the scheduled bandwidth of the PUSCH transmission, expressed as a number of subcarriers;

$M_{sc}^{PT-RS}(l)$ is the number of subcarriers in OFDM symbol l that carries PTRS, in the PUSCH transmission;

$Q'_{ACK}$ is the number of coded modulation symbols per layer for HARQ-ACK transmitted on the PUSCH if number of HARQ-ACK information bits is more than 2, and $Q'_{ACK}=0$ if the number of HARQ-ACK information bits is 1 or 2 bits;

$Q'_{CSI-1}$ is the number of coded modulation symbols per layer for CSI part 1 transmitted on the PUSCH;

$M_{sc}^{UCI}(l)$ is the number of resource elements that can be used for transmission of UCI in OFDM symbol l, for $i=0, 1, 2, \ldots, N_{symb,all}^{PUSCH}-1$, in the PUSCH transmission and $N_{symb,all}^{PUSCH}$ is the total number of OFDM symbols of the PUSCH, including all OFDM symbols used for DMRS;

for any OFDM symbol that carries DMRS of the PUSCH, $M_{sc}^{UCI}(l)=0$;

for any OFDM symbol that does not carry DMRS of the PUSCH, $M_{sc}^{UCI}(l)=M_{sc}^{PUSCH}-M_{sc}^{PT-RS}(l)$.

Accordingly, the number of REs for CSI-part 2 transmission on PUSCH without UL-SCH is calculated dependent on the number of REs used for HARQ-ACK and dependent on the number of REs used for CSI-part 1.

Certain aspects provide for determining a spectral efficiency (e.g., BPRE) for transmitting UCI without uplink data (e.g., UL-SCH data) on an uplink data channel (e.g., PUSCH) based on a parameter more indicative of a number of REs allocated for CSI-part 1 transmission (or another portion of UCI transmission) on PUSCH without UL-SCH as opposed to a total number of REs allocated for all UCI transmission on PUSCH without UL-SCH. Certain aspects are explained with respect to the discussed equations, but it should be noted that similar techniques utilizing similar calculations may also be used.

Figure 5:
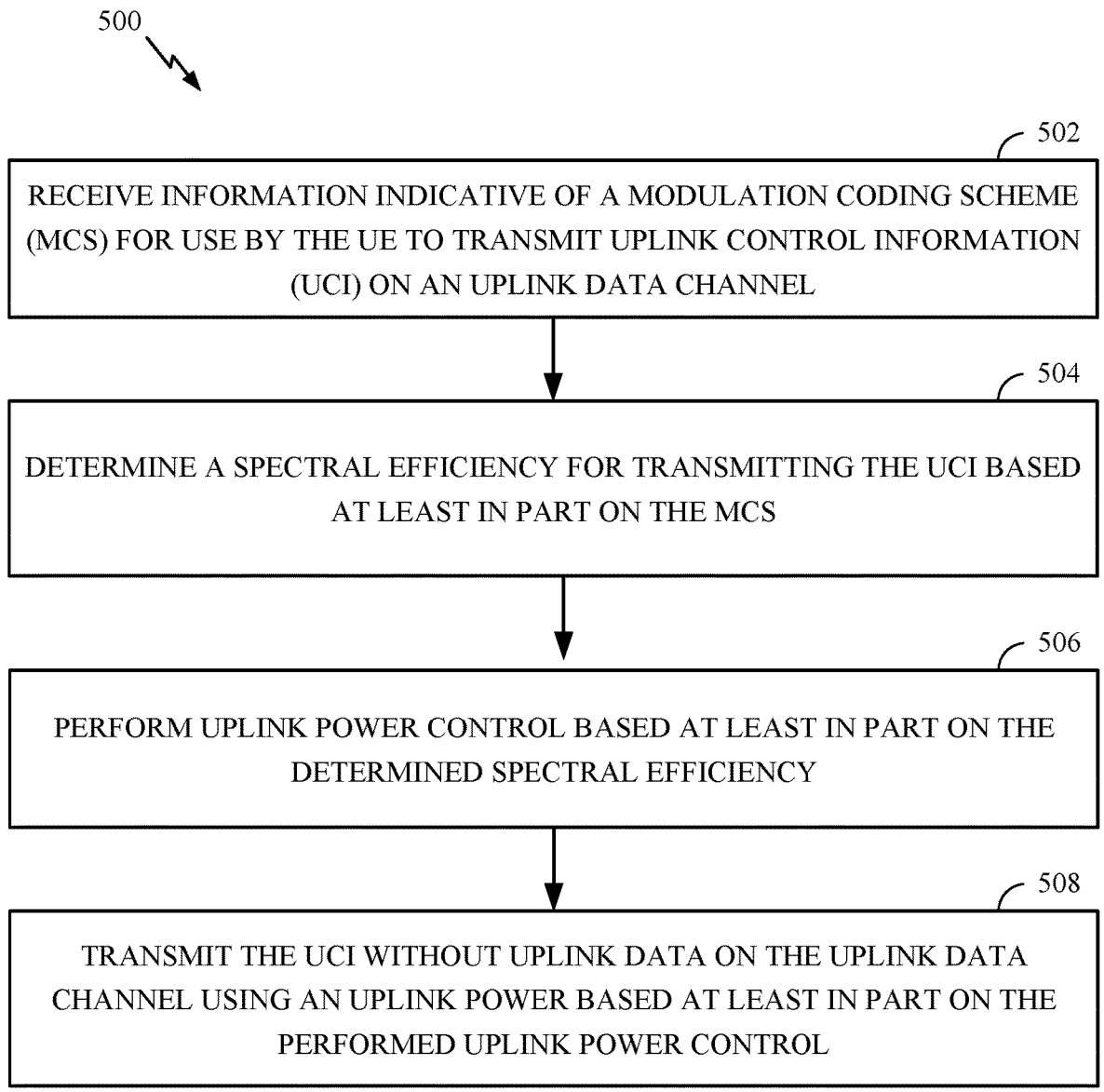
FIG. 5 is a flowchart illustrating example operations performed by a user equipment, in accordance with certain aspects of the present disclosure.

FIG. 5 illustrates example operations 500 performed by a UE (e.g., UE 120a of FIG. 1 or UE 120 of FIG. 2) for uplink data channel power control, in accordance with certain aspects of the present disclosure. Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 240) obtaining and/or outputting signals.

Operations 500 begin, at block 502, by receiving information indicative of a modulation coding scheme (MCS) for use by the UE to transmit uplink control information (UCI) on an uplink data channel. Operations 500 continue at block 504 by determining a spectral efficiency for transmitting the UCI based at least in part on the MCS. Operations 500 continue at block 506 by performing uplink power control based at least in part on the determined spectral efficiency. Operations 500 continue at block 508 by transmitting the UCI without uplink data on the uplink data channel using an uplink power based at least in part on the performed uplink power control.

In certain aspects, the information indicative of the MCS is received in downlink control information (DCI), such as from a BS 110. In certain aspects the MCS is received using RRC signaling, such as from a BS 110.

In certain aspects, the uplink data channel comprises a physical uplink shared channel (PUSCH), and transmitting the UCI without uplink data on the uplink data channel comprises transmitting the UCI without uplink shared channel (UL-SCH) data on the PUSCH.

In certain aspects, determining the spectral efficiency based at least in part on the MCS comprises determining the spectral efficiency based at least in part on a target code rate and modulation order indicated by the MCS.

Further, in certain aspects, the spectral efficiency is a BPRE.

Further, in certain aspects, determining the spectral efficiency is further based at least in part on a rate offset between a rate for transmitting UCI and a rate for transmitting uplink data on the uplink data channel. In certain aspects, the UCI comprises CSI-part 1, and the rate offset is between a rate for transmitting CSI-part 1 and the rate for transmitting uplink data on the uplink data channel. In certain aspects, the operations 500 further include receiving the rate offset.

In certain aspects, the spectral efficiency or BPRE is calculated according to the following equation:

$$BPRE = \frac{R * Q_m}{\beta_{offset}};$$

where,

R is a target code rate and $Q_m$ is a modulation order indicated by/corresponding to MCS signaled for UL-SCH data, though the UE does not actually have any UL-SCH data to transmit, and $\beta_{offset}$ is the rate offset between a rate for transmitting UCI and a rate for transmitting uplink data on the uplink data channel (e.g., the rate offset between a rate for transmitting CSI-part 1 and the rate for transmitting uplink data on the uplink data channel, such as $\beta_{offset}^{CSI-part1}$).

In certain aspects, $\beta_{offset}$ is greater than 1, and is received by UE 120 from BS 110 using radio resource control (RRC) signaling or received dynamically via DCI. In certain aspects, using $$\frac{R * Q_m}{\beta_{offset}}$$

for calculating spectral efficiency by UE 120, in addition to the discussed advantages, provides computational simplicity for calculating spectral efficiency, thereby reducing power consumption, processing power, and latency for calculating spectral efficiency by UE 120 as compared to other techniques. In certain aspects, $$\frac{R * Q_m}{\beta_{offset}}$$

is indicative of or an estimation of the number of bits for CSI-part 1 and associated CRC divided by the number of REs used for transmission of CSI-part 1 on an uplink data channel without uplink data.

In certain aspects, the UCI comprises CSI-part 1, and determining a spectral efficiency for transmitting uplink control information (UCI) without uplink data on the uplink data channel based at least in part on the MCS comprises: determining a number of bits corresponding to a payload of CSI-part 1 and cyclic redundancy check bits associated with CSI-part 1; determining a number of resource elements allocated for transmitting CSI-part 1 based at least in part on the MCS; and determining the spectral efficiency based at least in part on the determined number of bits and the determined number of resource elements.

In certain aspects, the UCI further comprises HARQ-ACK, and determining the number of resource elements allocated for transmitting CSI-part 1 based at least in part on the MCS comprises: determining a second number of resource elements allocated for transmitting HARQ-ACK; and determining the number of resource elements allocated for transmitting CSI-part 1 based at least in part on a minimum between: 1) a third number of resource elements allocated for transmitting the UCI minus the second number of resource elements allocated for transmitting the HARQ-ACK; and 2) a fourth number of resource elements determined based at least in part on the MCS.

For example, in certain aspects, the spectral efficiency or BPRE is calculated according to the following equation:

$$BPRE = \frac{O_{CSI}}{Q'_{CSI-1}};$$

where, $O_{CSI} = O_{CSI-1} + L_{CSI-1}$ (e.g., a number of bits corresponding to a payload of CSI-part 1 and cyclic redundancy check bits associated with CSI-part 1), and $Q'_{CSI-1}$ denotes the actual allocated REs for CSI part 1, which can be calculated according to the previous equation mentioned: if there is CSI part 2 to be transmitted on the PUSCH, $$Q'_{CSI-1} = \min\left\{\left\lceil\frac{(O_{CSI-1} + L_{CSI-1}) \cdot \beta_{offset}^{PUSCH}}{R \cdot Q_m}\right\rceil, \sum_{l=0}^{N_{symb,all}^{PUSCH}-1} M_{sc}^{UCI}(l) - Q'_{ACK}\right\}$$

else $$Q'_{CSI-1} = \sum_{l=0}^{N^{PUSCH}_{symb,all}-1} M^{UCI}_{sc}(l) - Q'_{ACK}.$$

In particular, as discussed $Q'_{CSI-1}$ is based on $Q'_{ACK}$, which corresponds to a number of resource elements allocated for transmitting HARQ-ACK. Further, $Q'_{CSI-1}$ is based on $$\sum_{l=0}^{N^{PUSCH}_{symb,all}-1} M^{UCI}_{sc}(l) - Q'_{ACK},$$

which corresponds to a number of resource elements allocated for transmitting the UCI minus the number of resource elements allocated for transmitting the HARQ-ACK. Further, $Q'_{CSI-1}$ is based on $$(O_{CSI-1} + L_{CSI-1}) * \frac{\beta_{offset}}{R * Q_m},$$

which corresponds to a number of resource elements determined based at least in part on the MCS.

In certain aspects, using $$\frac{O_{CSI}}{Q'_{CSI-1}}$$

to calculate spectral efficiency instead of $$\frac{R * Q_m}{\beta_{offset}}$$

may be more computationally complex, but may provide greater accuracy for more accurate power control and more of the benefits discussed herein that go along with accurate power control. Further, since $Q'_{CSI-1}$ is based on $Q'_{ACK}$ there may be additional latency in determining the number of ACK/negative ACK (NACK) bits to include in the HARQ-ACK in order to calculate $Q'_{ACK}$ and ultimately spectral efficiency.

As discussed, certain aspects determine spectral efficiency based on parameters associated with CSI-part 1. In certain aspects, similar parameters for other UCI, such as CSI-part 2 may be used instead to calculate spectral efficiency. However, utilizing the parameters associated with CSI-part 1 may provide certain additional advantages. For example, $Q'_{CSI-part2}$ is based on $Q'_{CSI-1}$ as discussed and therefore may take additional computational complexity and latency to calculate. Further, to utilize CSI-part 2, if there is a power headroom report (PHR) in carrier aggregation to be transmitted by the UE, and there is CSI transmission in a secondary component carrier and PHR for the secondary component carrier, using CSI-part 1, the UE can calculate PHR before it knows the RE allocation as well as the number of bits for CSI-part 2, thereby further reducing latency.

Figure 6:
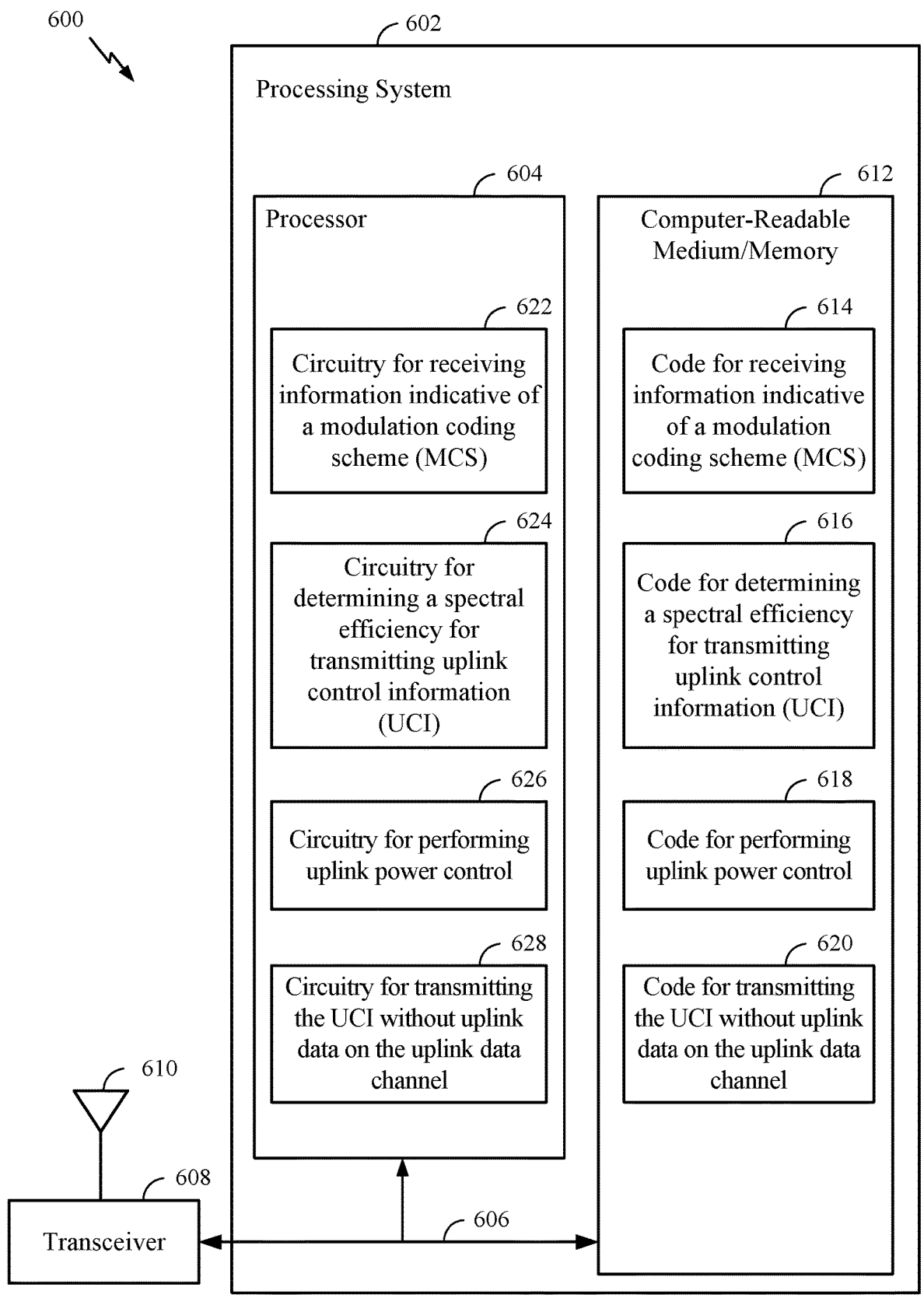
FIG. 6 is a block diagram conceptually illustrating a communication device that may include various components configured to perform operations for the techniques disclosed herein in accordance with aspects of the present disclosure To facilitate understanding, identical reference numerals have been used, where possible, to designate identical elements that are common to the figures. It is contemplated that elements disclosed in one aspect may be beneficially utilized on other aspects without specific recitation.

FIG. 6 illustrates a communications device 600 that may include various components (e.g., corresponding to means-plus-function components) configured to perform operations for the techniques disclosed herein, such as the operations illustrated in FIG. 5. The communications device 600 includes a processing system 602 coupled to a transceiver 608. The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions (e.g., computer-executable code) that when executed by the processor 604, cause the processor 604 to perform the operations illustrated in FIG. 5, or other operations for performing the various techniques discussed herein for uplink data channel power control, in accordance with certain aspects of the present disclosure. In certain aspects, computer-readable medium/memory 612 stores code for receiving information indicative of a modulation coding scheme (MCS) 614. In certain aspects, computer-readable medium/memory 612 stores code for determining a spectral efficiency for transmitting uplink control information (UCI) 616. In certain aspects, computer-readable medium/memory 612 stores code for performing uplink power control 618. In certain aspects, computer-readable medium/memory 612 stores code for transmitting the UCI without uplink data on the uplink data channel 620.

In certain aspects, the processor 604 has circuitry configured to implement the code stored in the computer-readable medium/memory 612. The processor 604 includes circuitry for receiving information indicative of a modulation coding scheme (MCS) 622. The processor 604 includes circuitry for determining a spectral efficiency for transmitting uplink control information (UCI) 624. The processor 604 includes circuitry for performing uplink power control 626. The processor 604 includes circuitry for transmitting the UCI without uplink data on the uplink data channel 628.

Additional Considerations

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 220, a TX MIMO processor 230, a receive processor 238, or antenna(s) 234 of the base station 110 and/or the transmit processor 264, a TX MIMO processor 266, a receive processor 258, or antenna(s) 252 of the user equipment 120. Additionally, means for generating, means for determining, means for performing, means for multiplexing, and/or means for applying may comprise one or more processors, such as the controller/processor 240 of the base station 110 and/or the controller/processor 280 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving information indicative of a modulation coding scheme (MCS) for use by the UE to transmit uplink control information (UCI) on an uplink data channel;
   determining a spectral efficiency for transmitting the UCI based at least in part on the MCS and on a rate offset between a rate for transmitting UCI and a rate for transmitting uplink data on the uplink data channel;
   performing uplink power control based at least in part on the determined spectral efficiency; and
   transmitting the UCI without uplink data on the uplink data channel using an uplink power based at least in part on the performed uplink power control.

2. The method of claim 1, wherein the uplink data channel comprises a physical uplink shared channel (PUSCH), and wherein transmitting the UCI without uplink data on the uplink data channel comprises transmitting the UCI without uplink shared channel (UL-SCH) data on the PUSCH.

3. The method of claim 1, wherein the UCI comprises channel state information (CSI)-part 1, and wherein the rate offset is between a rate for transmitting CSI-part 1 and the rate for transmitting uplink data on the uplink data channel.

4. The method of claim 1, further comprising receiving the rate offset.

5. The method of claim 4, wherein the rate offset is received using radio resource control (RRC) signaling or via downlink control information (DCI).

6. The method of claim 1, wherein the spectral efficiency is a bit per resource element (BPRE).

$$BPRE = \frac{R * Q_m}{\beta_{offset}},$$

7. The method of claim 6, wherein where:
   R=a target code rate indicated by the MCS,
   $Q_m$=a modulation order indicated by the MCS, and
   $\beta_{offset}$=the rate offset.

8. The method of claim 1, wherein determining the spectral efficiency based at least in part on the MCS comprises determining the spectral efficiency based at least in part on a target code rate and modulation order indicated by the MCS.

9. The method of claim 1, wherein the information indicative of the MCS is received using radio resource control (RRC) signaling or via downlink control information (DCI).

10. An user equipment (UE) configured for wireless communication, comprising:
    a memory; and
    a processor communicatively coupled to the memory, wherein the processor is configured to:
    receive information indicative of a modulation coding scheme (MCS) for use by the UE to transmit uplink control information (UCI) on an uplink data channel;
    determine a spectral efficiency for transmitting the UCI based at least in part on the MCS and on a rate offset between a rate for transmitting UCI and a rate for transmitting uplink data on the uplink data channel;
    perform uplink power control based at least in part on the determined spectral efficiency; and
    transmit the UCI without uplink data on the uplink data channel using an uplink power based at least in part on the performed uplink power control.

11. The UE of claim 10, wherein the uplink data channel comprises a physical uplink shared channel (PUSCH), and wherein the processor, being configured to transmit the UCI without uplink data on the uplink data channel, is further configured to transmit the UCI without uplink shared channel (UL-SCH) data on the PUSCH.

12. The UE of claim 10, wherein the UCI comprises channel state information (CSI)-part 1, and wherein the rate offset is between a rate for transmitting CSI-part 1 and the rate for transmitting uplink data on the uplink data channel.

13. The UE of claim 10, wherein the processor is further configured to receive the rate offset.

14. The UE of claim 13, wherein the rate offset is received using radio resource control (RRC) signaling or via downlink control information (DCI).

15. The UE of claim 10, wherein the spectral efficiency is a bit per resource element (BPRE).

16. The UE of claim 15, wherein where:

$$BPRE = \frac{R*Q_m}{\beta_{offset}},$$

R=a target code rate indicated by the MCS,
$Q_m$=a modulation order indicated by the MCS, and
$\beta_{offset}$=the rate offset.

17. The UE of claim 10, wherein the processor, being configured to determine the spectral efficiency based at least in part on the MCS, is further configured to determine the spectral efficiency based at least in part on a target code rate and modulation order indicated by the MCS.

18. The UE of claim 10, wherein the processor is further configured to receive information indicative of the MCS via radio resource control (RRC) signaling or via downlink control information (DCI).

19. An apparatus, comprising:
means for receiving information indicative of a modulation coding scheme (MCS) for use by the apparatus to transmit uplink control information (UCI) on an uplink data channel;
means for determining a spectral efficiency for transmitting the UCI based at least in part on the MCS and on a rate offset between a rate for transmitting UCI and a rate for transmitting uplink data on the uplink data channel;
means for performing uplink power control based at least in part on the determined spectral efficiency; and
means for transmitting the UCI without uplink data on the uplink data channel using an uplink power based at least in part on the performed uplink power control.

20. The apparatus of claim 19, further comprising means transmitting the UCI without uplink shared channel (UL-SCH) data on a physical uplink shared channel (PUSCH), wherein the uplink data channel comprises the PUSCH.

21. The apparatus of claim 19, wherein the UCI comprises channel state information (CSI)-part 1, and wherein the rate offset is between a rate for transmitting CSI-part 1 and the rate for transmitting uplink data on the uplink data channel.

22. The apparatus of claim 19, further comprising means for receiving the rate offset.

23. The apparatus of claim 22, wherein the means for receiving the rate offset comprises one or more of a radio resource control (RRC) signaling or a downlink control information (DCI).

24. The apparatus of claim 19, wherein the spectral efficiency is a bit per resource element (BPRE).

25. The apparatus of claim 24, wherein where:

$$BPRE = \frac{R*Q_m}{\beta_{offset}},$$

R=a target code rate indicated by the MCS,
$Q_m$=a modulation order indicated by the MCS, and
$\beta_{offset}$=the rate offset.

26. The apparatus of claim 19, wherein the means for determining the spectral efficiency is based at least in part on the MCS, a target code rate, and a modulation order indicated by the MCS.

27. The apparatus of claim 19, wherein the information indicative of the MCS is received via radio resource control (RRC) signaling or via downlink control information (DCI).

28. A non-transitory computer-readable storage medium that stores instructions that when executed by a processor of a user equipment (UE) cause the UE to perform a method of wireless communication, comprising:
receiving information indicative of a modulation coding scheme (MCS) for use by the UE to transmit uplink control information (UCI) on an uplink data channel;
determining a spectral efficiency for transmitting the UCI based at least in part on the MCS and on a rate offset between a rate for transmitting UCI and a rate for transmitting uplink data on the uplink data channel;
performing uplink power control based at least in part on the determined spectral efficiency; and
transmitting the UCI without uplink data on the uplink data channel using an uplink power based at least in part on the performed uplink power control.

29. The non-transitory computer-readable storage medium of claim 28, wherein the uplink data channel comprises a physical uplink shared channel (PUSCH), and wherein transmitting the UCI without uplink data on the uplink data channel comprises transmitting the UCI without uplink shared channel (UL-SCH) data on the PUSCH.

30. The non-transitory computer-readable storage medium of claim 28, wherein the UCI comprises channel state information (CSI)-part 1, and wherein the rate offset is between a rate for transmitting CSI-part 1 and the rate for transmitting uplink data on the uplink data channel.

31. The non-transitory computer-readable storage medium of claim 28, wherein the method further comprises receiving the rate offset.

32. The non-transitory computer-readable storage medium of claim 31, wherein the rate offset is received using radio resource control (RRC) signaling or via downlink control information (DCI).

33. The non-transitory computer-readable storage medium of claim 28, wherein the spectral efficiency is a bit per resource element (BPRE).

34. The non-transitory computer-readable storage medium of claim 33,
wherein where:

$$BPRE = \frac{R*Q_m}{\beta_{offset}},$$

R=a target code rate indicated by the MCS,
$Q_m$=a modulation order indicated by the MCS, and
$\beta_{offset}$=the rate offset.

35. The non-transitory computer-readable storage medium of claim 28, wherein determining the spectral efficiency based at least in part on the MCS further comprises determining the spectral efficiency based at least in part on a target code rate and modulation order indicated by the MCS.

36. The non-transitory computer-readable storage medium of claim 28, wherein the information indicative of the MCS is received using radio resource control (RRC) signaling or via downlink control information (DCI).

* * * * *